United States Patent
Winter et al.

(10) Patent No.: US 8,261,264 B2
(45) Date of Patent: Sep. 4, 2012

(54) ACCESSING A NETWORK

(75) Inventors: Robert Lee Winter, Leander, TX (US); Narayanan Subramaniam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 1113 days.

(21) Appl. No.: 12/033,397

(22) Filed: Feb. 19, 2008

(65) Prior Publication Data

US 2009/0178037 A1 Jul. 9, 2009

(30) Foreign Application Priority Data

Jan. 3, 2008 (IN) .............................. 24/DEL/2008

(51) Int. Cl.
*G06F 9/455* (2006.01)
*G06F 15/16* (2006.01)
(52) U.S. Cl. ............. 718/1; 709/227; 709/228; 709/229
(58) Field of Classification Search .................. None
See application file for complete search history.

(56) References Cited

U.S. PATENT DOCUMENTS

| | | | |
|---|---|---|---|
| 7,561,531 B2 * | 7/2009 | Lewites et al. ................ 370/254 |
| 2005/0165786 A1 | 7/2005 | Ahmed et al. |
| 2006/0294211 A1 | 12/2006 | Amato |
| 2007/0025246 A1 | 2/2007 | Pirzada et al. |
| 2007/0101323 A1 * | 5/2007 | Foley et al. ....................... 718/1 |
| 2007/0294421 A1 * | 12/2007 | Octaviano et al. ............ 709/230 |
| 2008/0163207 A1 * | 7/2008 | Reumann et al. ................ 718/1 |
| 2008/0189432 A1 * | 8/2008 | Abali et al. .................... 709/238 |
| 2009/0157882 A1 * | 6/2009 | Kashyap ........................ 709/227 |
| 2009/0185551 A1 | 7/2009 | Winter |

* cited by examiner

*Primary Examiner* — Meng An
*Assistant Examiner* — Bing Zhao
(74) *Attorney, Agent, or Firm* — Haynes and Boone, LLP

(57) ABSTRACT

An information handling system (IHS) includes a hypervisor and a plurality of virtual machines (VMs). The hypervisor includes hypervisor network information. Each of the VMs includes a virtual processor and a virtual memory that is coupled to the virtual processor. The virtual memory includes VM network information and computer readable instructions to synchronize the VM network information with the hypervisor network information.

16 Claims, 2 Drawing Sheets

ACCESSING A NETWORK

BACKGROUND

The present disclosure relates generally to information handling systems, and more particularly to virtual machines accessing networks.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs include virtual machines (VMs) connected to networks. In such an IHS, the VMs may be connected to a single network, yet each VM may be required to discover information about the network in order to use the network. This may cause wasted time and resources while each VM individually performs the discovery process.

Additionally, in many environments, VMs may be migrated between IHSs based upon power conservation, performance, load balancing, and resource utilization needs. A consequence of such VM migrations is that they require the operating system (OS) of each VM to relearn network information associated with the new IHS environment before using the network. Until the network information is relearned, each of the VMs cannot access the network, and likewise, any network services provided by the VMs cannot be utilized by remote client applications.

Accordingly, it would be desirable to improve access to a network which avoids the problems set forth above.

SUMMARY

According to one embodiment, an information handling system (IHS) is provided. The IHS includes a hypervisor and a plurality of virtual machines (VMs). The hypervisor includes hypervisor network information. Each of the VMs includes a virtual processor and a virtual memory that is coupled to the virtual processor. The virtual memory includes VM network information and computer readable instructions to synchronize the VM network information with the hypervisor network information.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components. In an embodiment, an IHS may further include a hypervisor and a plurality of virtual machines (VMs). A hypervisor may include software that provides virtual hardware (e.g., virtual processors, virtual memory) to the plurality of virtual machines. Each of the plurality of virtual machines may be able to run an operating system (OS) concurrently.

Figure 1:
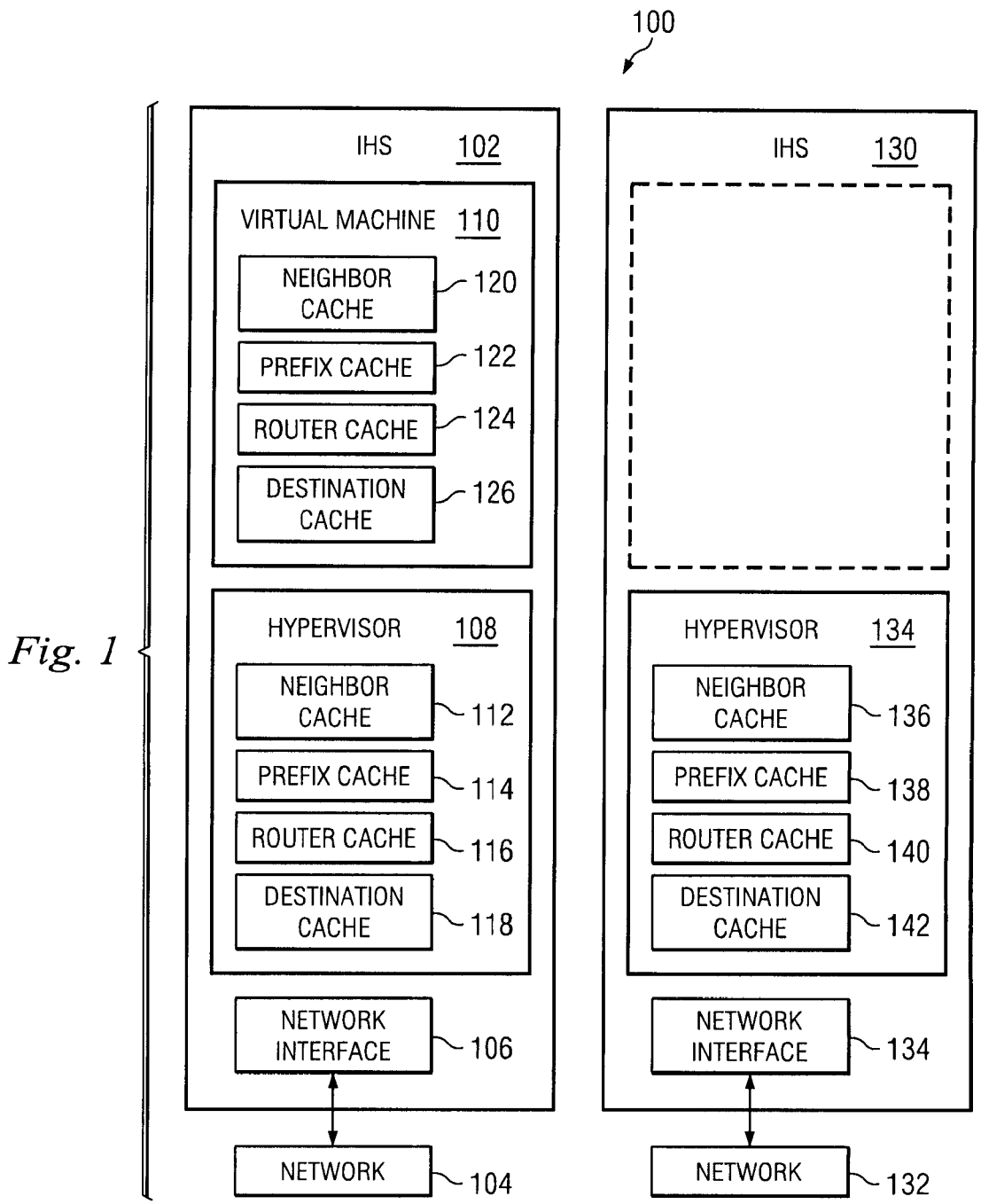
FIG. 1 illustrates an embodiment of a system for accessing a network.

Referring now to FIG. 1, an embodiment of a system 100 for accessing an IPv6 network is illustrated. The system 100 includes an IHS 102 coupled to a network 104. The network 104 is a Transport Control Protocol/Internet Protocol TCP/IP network, wherein the Internet Protocol version 6 (IPv6) network layer protocol is supported. The IHS 102 includes a network interface 106 for communicating through the network 104. The IHS 102 also includes additional hardware (not shown) such as, for example, processors, memory, and storage devices. Software of the IHS 102 includes a hypervisor 108 and a VM 110. The hypervisor 108 includes a variety of network information relating to the network 104, including a neighbor cache 112, a prefix cache 114, a router cache 116, and a destination cache 118. Similarly, the VM 110 includes a variety of network information relating to the network 104, including a neighbor cache 120, a prefix cache 122, a router cache 124, and a destination cache 126. As described in further detail below, the neighbor cache 120, the prefix cache 122, the router cache 124, and the destination cache 126 of the VM 110 may be synchronized with the neighbor cache 112, the prefix cache 114, the router cache 116, and the destination cache 118, respectively, of the hypervisor 108. The system 100 further includes an IHS 130 coupled to a network 132. The IHS 130 functions in a manner similar to IHS 102 and includes a network interface 134 coupled to the network 132 and a hypervisor 134. The hypervisor 134 includes a neighbor cache 136, a prefix cache 138, a router cache 140, and a destination cache 142. In an embodiment, the VM 110 may be migrated from the IHS 102 to the IHS 130 in order to use hardware of the IHS 130. The migration may be performed, for example, by a system administrator. After such a migration the neighbor cache 120, the prefix cache 122, the router cache 124, and the destination cache 126 of the VM 110 may be synchronized with the neighbor cache 136, the prefix cache 138, the router cache 140, and the destination cache 142, respectively, of the hypervisor 134, as described in further detail below.

The network information may be used by one or more layers of a TCP/IP stack (e.g., a TCP/IP stack included in software and virtual hardware of the VM 110) to communicate through a network. A neighbor cache includes information about neighboring hosts on the local network such as, for example, link layer addresses, IPv6 addresses, router flags (i.e., whether the neighboring host is a router), and a reachability state (i.e., whether the neighboring host is presently reachable). A prefix cache includes an address prefix of the local network and address prefixes of other accessible networks. A router cache includes information about a default router and any other routers on the local network. A destination cache includes information about routes to hosts (i.e., non-neighboring hosts and/or neighboring hosts).

Figure 2:
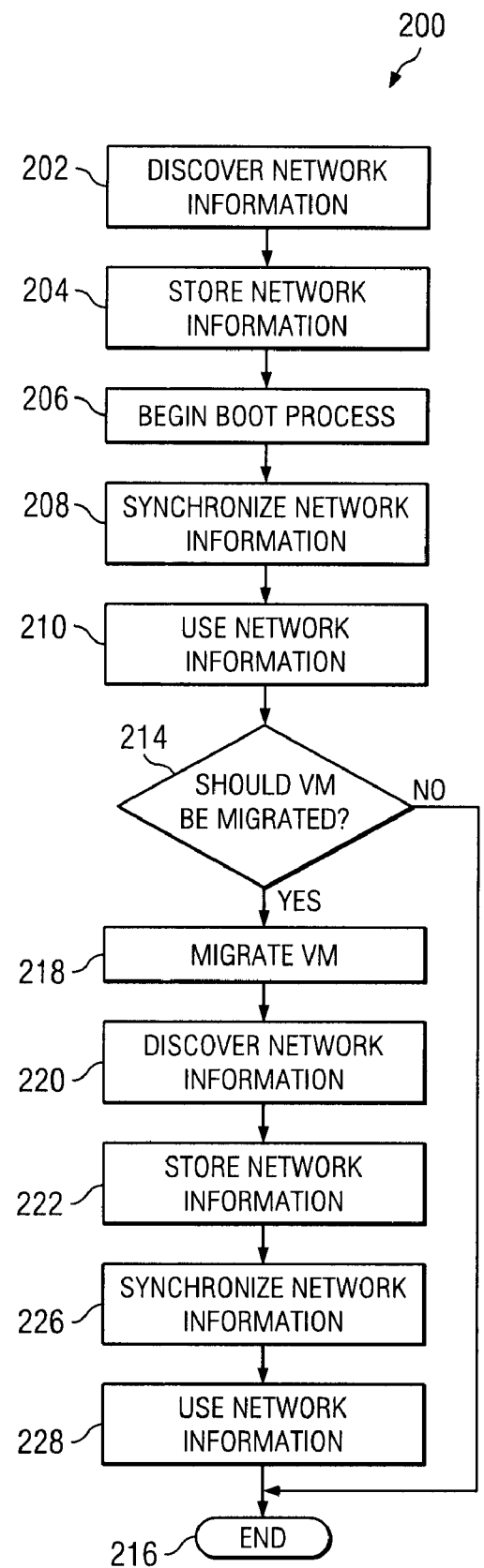
FIG. 2 illustrates an embodiment of a method to access a network using the system of FIG. 1.

Referring now to FIG. 2, an embodiment of a method 200 to access an IPv6 network is illustrated. The method 200 begins at block 202 where the hypervisor 108 discovers network information about the network 104. The network information is stored in caches such as the neighbor cache 112, the prefix cache 114, the router cache 116, and the destination cache 118, described above. The hypervisor 108 may use various techniques and/or protocols to discover the IPv6 network information such as, for example, neighbor discovery, address autoconfiguration, receiving network information from VMs of the IHS 102, and/or monitoring network packets that are sent to and from VMs of the IHS 102.

The method 200 then proceeds to block 204 where the hypervisor 108 stores the network information. The network information may be stored in a storage area (e.g., memory, hard drive) which may be private to the hypervisor 108 or shared with one or more VMs of the IHS 102. In an embodiment, the hypervisor 108 may include a TCP/IP stack, which may use the network information in order to communicate through the network 102.

The method 200 then proceeds to block 206 where the VM 110 begins a boot process. The boot process of the VM 110 may be initiated by the hypervisor 108, for example, and may include initialization of virtual hardware and booting of an OS in the VM 110. In an alternative embodiment, the VM 110 may begin the boot process prior to the hypervisor 108 discovering the network information.

The method 200 then proceeds to block 208 where the VM 110 synchronizes its network information (e.g., the neighbor cache 120, the prefix cache 122, the router cache 124, and the destination cache 126) with the IPv6 network information discovered by the hypervisor 108. The synchronizing of the network information may include the VM 110 retrieving some or all of the network information from the hypervisor 108, and creating or updating the neighbor cache 120, the prefix cache 122, the router cache 124, and the destination cache 126 accordingly. The retrieval of the network information from the hypervisor 108 may be performed by using an interface (e.g., an application programming interface (API)), message passing, or shared memory. In an embodiment, the VM 110 may synchronize the network information during initialization of a TCP/IP stack and/or an OS of the VM 110. In an embodiment, the VM 110 may periodically synchronize the network information with the hypervisor 108 after the boot process of the VM 110 has completed. In an embodiment, the synchronization may occur in both directions so that, for example, the hypervisor 108 may update the neighbor cache 112, the prefix cache 114, the router cache 116, and the destination cache 118 with network information retrieved from the VM 110, and/or vice versa. In an embodiment, the hypervisor 108 may support network information synchronization with a plurality of concurrently-running VMs. The plurality of VMs may be running a variety of different OSs and may be connected to a variety of different networks. In an embodiment, the synchronization may further include updating a link layer resolution table and/or a routing table of the OS of the VM 110.

The method 200 then proceeds to block 210 where the VM 110 uses the network information from the hypervisor 108 to communicate through the network 102. For example, the VM 110 may use the neighbor cache 120 to communicate with a neighbor host on a local network, or may use the router cache 124 and/or the destination cache 126 to communicate with a remote host on a remote network. In an embodiment, any of the neighbor cache 120, the prefix cache 122, the router cache 124, and the destination cache 126 may be used by OS routing code and/or various layers of the TCP/IP stack of the VM 110 such as link layer software (e.g., a network device driver).

The method 200 then proceeds to decision block 214 where it is determined whether the VM 110 should be migrated to the IHS 130. This determination may be made, for example, by a system administrator who desires that the VM 110 be run on the hardware of the IHS 130 instead of the hardware of the IHS 102. This may be made possible by the hypervisors 108 and 134 being flexible enough to allow VMs to be modularly moved from one system to another. If at decision block 214 it is determined that the VM 110 should not be migrated to the IHS 130, the method 200 ends at block 216.

If at decision block 214 it is determined that the VM 110 should be migrated to the IHS 130, the method 200 then proceeds to block 218 where the VM 110 is migrated to the IHS 130. The migration may be performed, for example, by the system administrator.

The method 200 then proceeds to block 220 where the hypervisor 134 discovers network information about the network 132. The discovering may be performed in a fashion similar to as described above with reference to the hypervisor 108 in block 202. The network information discovered by the hypervisor 134 ;may include the neighbor cache 136, the prefix cache 138, the router cache 140, and the destination cache 142. In an alternative embodiment, the hypervisor 134 may discover the network information prior to the VM 110 being migrated to the IHS 130.

The method 200 then proceeds to block 222 where the hypervisor 134 stores the network information. The storing may be performed similar to as described above with reference to the hypervisor 108 in block 204.

The method 200 then proceeds to block 226 where the VM 110 synchronizes its network information (e.g., the neighbor cache 120, the prefix cache 122, the router cache 124, and the destination cache 126) with the IPv6 network information discovered by the hypervisor 134. The synchronization may be performed in a fashion similar to as described above with reference to block 208.

The method 200 then proceeds to block 228 where the VM 110 uses the network information from the hypervisor 134 to communicate through the network 132. The network information may be used in a fashion similar to as described above with reference to block 210. The method 200 then ends at block 216.

It should be understood that the present invention is not limited to hypervisors and virtual machines. For example, in an embodiment, a server IHS may collect the network information, and client IHSs may then synchronize network information in the client IHSs with the network information in the server IHS. Further, it should be understood that network information is not strictly limited to neighbor caches, prefix caches, router caches, and destination caches. One of skill in the art will recognize that a variety of types of network information may be used in accordance with the present invention. Additionally, it should be understood that the present invention is not limited to IPv6 networks. One of skill in the art will recognize that a variety of other network protocols may be used.

Thus, embodiments are provided for enabling a VM to access a network. A hypervisor discovers and stores network information about the network. The VM synchronizes network information of the VM with the network information of the hypervisor.

Although illustrative embodiments have been shown and described, a wide range of modification, change, and substitution is contemplated in the foregoing disclosure and in some instances, some features of the embodiments may employed without a corresponding use of other features. Accordingly, it is appropriate that the appended claims be construed broadly and in a manner consistent with the scope of the embodiment discussed herein.

What is claimed is:

1. A virtual machine (VM) migration system, comprising:
    at least one network;
    a first information handling system (IHS) that is coupled to the at least one network and that includes a first hypervisor that discovers first network information about the at least one network and stores the first network information in a first hypervisor neighbor cache, a first hypervisor prefix cache, a first hypervisor router cache, and a first hypervisor destination cache;
    a second IHS that is coupled to the at least one network and includes a second hypervisor that discovers second network information about the at least one network and stores the second network information in a second hypervisor neighbor cache, a second hypervisor prefix cache, a second hypervisor router cache, and a second hypervisor destination cache, wherein at least some of the second network information is different from the first network information; and
    a VM that includes a VM neighbor cache, a VM prefix cache, a VM router cache, and a VM destination cache, wherein the VM is operable:
        in response to a boot process initiated by the first hypervisor such that the VM is operated using the first IHS, to initially synchronize the VM neighbor cache with the first hypervisor neighbor cache, the VM prefix cache with the first hypervisor prefix cache, the VM router cache with the first hypervisor router cache, and the VM destination cache with the first hypervisor destination cache such that the first network information is available for use by the VM running on the first IHS to communicate through the at least one network;
        subsequent to the completion of the boot process, to periodically synchronize the VM neighbor cache with the first hypervisor neighbor cache, the VM prefix cache with the first hypervisor prefix cache, the VM router cache with the first hypervisor router cache, and the VM destination cache with the first hypervisor destination cache;
        in response to being migrated to the second IHS such that the VM is operated using the second IHS, to automatically synchronize the VM neighbor cache with the second hypervisor neighbor cache, the VM prefix cache with the second hypervisor prefix cache, the VM router cache with the second hypervisor router cache, and the VM destination cache with the second hypervisor destination cache such that the second network information is available for use by the VM running on the second IHS to communicate through the at least one network; and
        subsequent to the migrating, periodically synchronizing the VM neighbor cache with the second hypervisor neighbor cache, the VM prefix cache with the second hypervisor prefix cache, the VM router cache with the second hypervisor router cache, and the VM destination cache with the second hypervisor destination cache.

2. The system of claim 1, wherein the first network information and the second network information each include a routing table and a link layer resolution table.

3. The system of claim 1, wherein the retrieval of the first network information includes using an interface provided by the first hypervisor and the retrieval of the second network information includes using an interface provided by the second hypervisor.

4. A method comprising:
    providing a virtual machine (VM) on a first information handling system (IHS) that is coupled to a second IHS through at least one network, wherein the first IHS includes a first hypervisor and the second IHS includes a second hypervisor;
    discovering first network information about the at least one network and storing the first network information in the first hypervisor in a first hypervisor neighbor cache, a first hypervisor prefix cache, a first hypervisor router cache, and a first hypervisor destination cache;
    discovering second network information about the at least one network and storing the second network information in the second hypervisor in a second hypervisor neighbor cache, a second hypervisor prefix cache, a second hypervisor router cache, and a second hypervisor destination cache, wherein at least some of the second network information is different from the first network information;
    initially synchronizing, when the VM is booted using the first IHS, a VM neighbor cache in the VM with the first hypervisor neighbor cache, a VM prefix cache in the VM with the first hypervisor prefix cache, a VM router cache in the VM with the first hypervisor router cache, and a VM destination cache in the VM with the first hypervisor destination cache;
    periodically synchronizing, while the VM is located using the first IHS, the VM neighbor cache with the first hypervisor neighbor cache, the VM prefix cache with the first hypervisor prefix cache, the VM router cache with the first hypervisor router cache, and the VM destination cache with the first hypervisor destination cache;
    communicating over the at least one network with the VM running on the first IHS using the first network information in the VM;
    migrating the VM to the second IHS such that the VM is operated using the second IHS;
    in response to the migrating, automatically synchronizing the VM neighbor cache with the second hypervisor neighbor cache, the VM prefix cache with the second hypervisor prefix cache, the VM router cache with the second hypervisor router cache, and the VM destination cache with the second hypervisor destination cache;
    subsequent to the migrating, periodically synchronizing the VM neighbor cache with the second hypervisor neighbor cache, the VM prefix cache with the second hypervisor prefix cache, the VM router cache with the second hypervisor router cache, and the VM destination cache with the second hypervisor destination cache; and
    communicating over the at least one network with the VM running on the second IHS using the second network information in the VM.

5. The method of claim 4, wherein the migration is performed by a system administrator.

6. The method of claim 4, wherein the second hypervisor router cache includes information about at least one IPv6-capable router on a local network in the at least one network.

7. The method of claim 6, wherein one of the at least one IPv6-capable router is marked in the second hypervisor router cache as a default router for the second IHS.

8. The method of claim 4, wherein the second hypervisor prefix cache includes at least one address prefix, wherein each of the at least one address prefix corresponds to an accessible network in the at least one network.

9. The method of claim 8, wherein one of the at least one address prefix corresponds to a local network in the at least one network.

10. The method of claim 8, wherein at least one of the at least one address prefix corresponds to a remote network in the at least one network.

11. The method of claim 4, wherein the second hypervisor neighbor cache includes a link layer address of further IHSs on a local network in the at least one network.

12. The method of claim 4, wherein the second hypervisor destination cache includes information about network routes to further IHSs.

13. The method of claim 4, wherein the migration is performed by a system administrator.

14. The method of claim 4, wherein the second network information includes a routing table and a link layer resolution table.

15. A method comprising:
providing a first information handling system (IHS) that is coupled to a second IHS through at least one network, wherein the first IHS includes a first hypervisor that includes a first hypervisor neighbor cache, a first hypervisor prefix cache, a first hypervisor router cache, and a first hypervisor destination cache, and wherein the second IHS includes a second hypervisor that includes a second hypervisor neighbor cache, a second hypervisor prefix cache, a second hypervisor router cache, and a second hypervisor destination cache;
discovering first network information about the at least one network and storing the first network information in the first hypervisor neighbor cache, the first hypervisor prefix cache, the first hypervisor router cache, and the first hypervisor destination cache;
discovering second network information about the at least one network and storing the second network information in the second hypervisor neighbor cache, the second hypervisor prefix cache, the second hypervisor router cache, and the second hypervisor destination cache, wherein at least some of the second network information is different from the first network information;
booting a virtual machine (VM) on the first IHS such that the VM is operated using the first IHS and, in response, initially synchronizing a VM neighbor cache in the VM with the first hypervisor neighbor cache, a VM prefix cache in the VM with the first hypervisor prefix cache, a VM router cache in the VM with the first hypervisor router cache, and a VM destination cache in the VM with the first hypervisor destination cache;
periodically synchronizing, while the VM is located on the first IHS, the VM neighbor cache with the first hypervisor neighbor cache, the VM prefix cache with the first hypervisor prefix cache, the VM router cache with the first hypervisor router cache, and the a VM destination cache with the first hypervisor destination cache;
communicating over the at least one network with the VM running on the first IHS using the first network information in the VM;
migrating the VM to the second IHS over the at least one network such that the VM is operated using the second IHS;
subsequent to the migrating, periodically synchronizing the VM neighbor cache with the second hypervisor neighbor cache, the VM prefix cache with the second hypervisor prefix cache, the VM router cache with the second hypervisor router cache, and the VM destination cache with the second hypervisor destination cache; and
communicating over the at least one network with the VM running on the second IHS using the second network information in the VM.

16. The method of claim 15, further comprising:
initially synchronizing the VM neighbor cache with the second hypervisor neighbor cache, the VM prefix cache with the second hypervisor prefix cache, the VM router cache with the second hypervisor router cache, and the VM destination cache with the second hypervisor destination cache in response to migrating the VM to the second IHS.

* * * * *